(12) United States Patent
Ren (10) Patent No.: US 10,693,875 B2
(45) Date of Patent: Jun. 23, 2020

(54) AUTHENTICATION CENTER SYSTEM

(71) Applicant: Shaohua Ren, Beijing (CN)

(72) Inventor: Shaohua Ren, Beijing (CN)

(*) Notice: Subject to any disclaimer, the term of this patent is extended or adjusted under 35 U.S.C. 154(b) by 182 days.

(21) Appl. No.: 15/998,356

(22) Filed: Aug. 7, 2018

(65) Prior Publication Data

US 2019/0081948 A1    Mar. 14, 2019

Related U.S. Application Data

(63) Continuation of application No. PCT/CN2017/071613, filed on Jan. 18, 2017.

(30) Foreign Application Priority Data

| Feb. 18, 2016 | (CN) | 2016 1 0091443 |
| Feb. 25, 2016 | (CN) | 2016 1 0105827 |
| Mar. 4, 2016 | (CN) | 2016 1 0125790 |
| Oct. 26, 2016 | (CN) | 2016 1 0941814 |

(51) Int. Cl.
| *H04L 29/06* | (2006.01) |
| *G06F 21/42* | (2013.01) |
| *G06F 21/45* | (2013.01) |
| *G06Q 20/10* | (2012.01) |
| *G06Q 20/40* | (2012.01) |
| *G06Q 20/02* | (2012.01) |

(52) U.S. Cl.
CPC .......... *H04L 63/0884* (2013.01); *G06F 21/42* (2013.01); *G06F 21/45* (2013.01); *G06Q 20/02* (2013.01); *G06Q 20/10* (2013.01); *G06Q 20/40* (2013.01); *H04L 63/0421* (2013.01); *H04L 63/08* (2013.01); *H04L 63/105* (2013.01); *H04L 63/107* (2013.01); *H04L 63/108* (2013.01); *H04L 63/308* (2013.01); *G06F 2221/2143* (2013.01)

(58) Field of Classification Search
None
See application file for complete search history.

(56) References Cited

U.S. PATENT DOCUMENTS

| 2009/0320108 | A1* | 12/2009 | Livingston | G06F 21/31 726/6 |
| 2014/0173708 | A1* | 6/2014 | Garlick | H04L 63/08 726/7 |
| 2019/0050557 | A1* | 2/2019 | Martin | G06F 21/45 |

* cited by examiner

*Primary Examiner* — Andrew J Steinle (57) ABSTRACT

This invention provides an authentication center system which enables a user to manage the specific account information of the user's accounts at different service parties centrally in one authentication center.

20 Claims, 1 Drawing Sheet

AUTHENTICATION CENTER SYSTEM

TECHNICAL FIELD

This invention is about the authentication center systems or methods.

BACKGROUND

Nowadays people generally use different terminals to log in their own accounts at various websites and online service providers. And each of the accounts which a user has at different service parties has specific account information for the account, such as: user profile photo, user name, phone number, mail address, contact address, real-name authentication information, etc. But there has not existed a system or method by which a user can manage the user's specific account information at different service parties centrally at one authentication center.

SUMMARY

In view of the above problems, this invention provides an authentication center system or method to enable a user to manage the specific account information of the user's accounts at different service parties centrally at one authentication center.

whereAn authentication center system, comprising an authentication center, service parties, users and terminals; where a service party is a provider of service on internet which provides service through internet, and the service parties are different and separate providers of service on internet; where the authentication center is a service provider which provides service through internet, and the authentication center is not one of the service parties; where the terminals are connected with the authentication center and the service parties by a network and are capable of communicating with them; where the terminals, the service parties and the authentication center are connected through internet; where a user has a user account at the authentication center, and the AUID of a user is a user account which the user has at the authentication center; where a user has a user account at one service party or at each of more than one service party separately, and an APID of a user is a user account which the user has at a service party; where a user is capable of using a terminal to establish a separate connection with the authentication center and a separate connection with a service party separately, and the user is capable of using the terminal to log in the AUID which the user has at the authentication center through the separate connection with the authentication center and to log in the APID which the user has at the service party through the separate connection with the service party separately; where the authentication center stores the corresponding relationships between the AUID of a user and the APIDs which the user has at different service parties; where an APID which a user has at a service party is capable of having the specific account information of the APID which the user has at the service party; where a terminal's interface which has logged in the AUID which a user has at the authentication center is capable of displaying the specific account information of the APIDs which the user has at different service parties separately, and on the terminal's interface which has logged in the AUID which the user has at the authentication center, the user is capable of setting to change the specific information of the APIDs which the user has at different service parties separately, and the authentication center is capable of sending the setting of the user to the corresponding service party; where the specific account information of an APID which a user has at a service party includes one or more of the following types of information, where the following types of information include user profile photo and user name and user contact information and user real-name authentication information; where if the specific account information includes user contact information, the user contact information of a user includes the mobile phone number of the user and/or the email address of the user; where if the specific account information includes user real-name authentication information, a user is capable of operating on a terminal's interface which has logged in the AUID which the user has at the authentication center to transfer and set the real-name authentication information of the user authenticated at the authentication center to a service party when the service party and the authentication center permit, and/or a user is capable of operating on a terminal's interface which has logged in the AUID which the user has at the authentication center to delete and/or to invalidate the real-name authentication information which the user sets for a service party when the service party and the authentication center permit.

Optionally, the communication path or route of the separate connection which a user establishes to a service party by using a terminal doesn't include or doesn't pass through the authentication center, and the communication path or route of the separate connection which a user establishes to the authentication center by using a terminal doesn't include or doesn't pass through a service party.

Optionally, a user has a user account or an APID at each of at least two different service parties separately.

Optionally, a user is capable of using different terminals to log in a service party; where the APIDs which a user has at different service parties are separate from each other.

Optionally, a service party stores the specific account information of the APIDs which users have at the service party locally at the service party and the authentication center is capable of sending a user's setting of the specific account information of an APID which the user has at the service party to the service party, or when a service party needs to use the specific account information of a user, the service party is capable of getting the specific account information of the user from the authentication center and the specific account information of the user is set by the user at the authentication center for the service party.

Optionally, a terminal's interface which has logged in the AUID which a user has at the authentication center is capable of displaying separately the APIDs which the user has at different service parties, and/or a terminal's interface which has logged in the AUID which a user has at the authentication center is capable of displaying separately the service parties which have associated with the user's AUID.

Optionally, on a terminal's interface which has logged in the AUID which a user has at the authentication center, the user is capable of setting to change the specific information of the APID which the user has at a service party, and the authentication center is capable of sending the setting of the user to the service party.

Optionally, a user uses an authentication program to log in the AUID which the user has at the authentication center, where the program which the user uses to log in the APID which the user has at a service party is not the authentication program.

Optionally, the specific account information of an APID which a user has at a service party includes the permission to permit the APID which the user has at the service party to pay and/or to receive the payment, and/or includes the permission to permit the APID which the user has at the service party to pay and/or to receive the payment through the user's other fund account which is not at the service party.

Optionally, the APIDs of a user have capable of having the historic records of the logins by which different terminals or different programs on different terminals log in the APIDs which the user has at different service parties, where a terminal's interface which has logged in the AUID which a user has at the authentication center is capable of displaying the historic records of the logins by which different terminals or different programs on different terminals log in the APIDs which the user has at different service parties separately, and the historic records include the identification information of different terminals or the identification information of different programs on different terminals, where the historic records include login time and/or login duration, where a service party is capable of sending the records of the logins by which different terminals or different programs on different terminals log in the APID which a user has at the service party to the authentication center.

Optionally, the specific account information of an APID which a user has at a service party includes the login rule according to which the user logs in the APID which the user has at the service party, where the login rule according to which the user logs in the APID which the user has at the service party includes one or more of the following rules, where the following rules include: whether the user is capable of logging in the APID simultaneously by using different terminals or different terminal programs, the IP range of the user in which the user is capable of logging in the APID of the user, the geographic range of the user in which the user is capable of logging in the APID of the user, the time range in which the user is capable of logging in the APID of the user, and the inactive duration after which the user's logging in the APID will be invalidated.

Optionally, the terminals, the service parties and the authentication center are connected through internet, where the information transmission between the terminals, the service parties and the authentication center is transferred through internet.

Optionally, where a user is capable of setting at a terminal's interface which has logged in the user's AUID at the authentication center to permit or forbid a specific service party to get the specific account information from the authentication center.

An authentication center system, comprising an authentication center, service parties, users and terminals; where a service party is a provider of service on internet which provides service through internet, and the service parties are different and separate providers of service on internet; where the authentication center is a service provider which provides service through Internet, and the authentication center is not one of the service parties; where the terminals are connected with the authentication center and the service parties by a network and are capable of communicating with them; where the terminals, the service parties and the authentication center are connected through internet; where a user has a user account at the authentication center, and the AUID of a user is a user account which the user has at the authentication center; where a user has a user account at one service party or at each of more than one service party separately, and an APID of a user is a user account which the user has at a service party; where a user is capable of using a terminal to establish a separate connection with the authentication center and a separate connection with a service party separately, and the user is capable of using the terminal to log in the AUID which the user has at the authentication center through the separate connection with the authentication center and to log in the APID which the user has at the service party through the separate connection with the service party separately; where the authentication center stores the corresponding relationships between the AUID of a user and the APIDs which the user has at different service parties; where an APID which a user has at a service party is capable of having the specific account information of the APID which the user has at the service party; where a terminal's interface which has logged in the AUID which a user has at the authentication center is capable of displaying the specific account information of the APIDs which the user has at different service parties separately, and on the terminal's interface which has logged in the AUID which the user has at the authentication center, the user is capable of setting to change the specific information of the APIDs which the user has at different service parties separately, and the authentication center is capable of sending the setting of the user to the corresponding service party; where the specific account information of an APID which a user has at a service party includes the permission to permit the APID which the user has at the service party to pay and/or to receive the payment, and/or includes the permission to permit the APID which the user has at the service party to pay and/or to receive the payment through the user's other fund account which is not at the service party.

Optionally, the communication path or route of the separate connection which a user establishes to a service party by using a terminal doesn't include or doesn't pass through the authentication center, and the communication path or route of the separate connection which a user establishes to the authentication center by using a terminal doesn't include or doesn't pass through a service party; where a user is capable of using different terminals to log in a service party; where the APIDs which a user has at different service parties are separate from each other.

Optionally, a user has a user account or an APID at each of at least two different service parties separately.

An authentication center system, comprising an authentication center, service parties, users and terminals; where a service party is a provider of service on internet which provides service through internet, and the service parties are different and separate providers of service on internet; where the authentication center is a service provider which provides service through internet, and the authentication center is not one of the service parties; where the terminals are connected with the authentication center and the service parties by a network and are capable of communicating with them; where the terminals, the service parties and the authentication center are connected through internet; where a user has a user account at the authentication center, and the AUID of a user is a user account which the user has at the authentication center; where a user has a user account at one service party or at each of more than one service party separately, and an APID of a user is a user account which the user has at a service party; where a user is capable of using a terminal to establish a separate connection with the authentication center and a separate connection with a service party separately, and the user is capable of using the terminal to log in the AUID which the user has at the authentication center through the separate connection with the authentication center and to log in the APID which the user has at the service party through the separate connection with the service party separately; where the authentication center stores the corresponding relationships between the AUID of a user and the APIDs which the user has at different service parties; where an APID which a user has at a service party is capable of having the specific account information of the APID which the user has at the service party; where a terminal's interface which has logged in the AUID which a user has at the authentication center is capable of displaying the specific account information of the APIDs which the user has at different service parties separately, and on the terminal's interface which has logged in the AUID which the user has at the authentication center, the user is capable of setting to change the specific information of the APIDs which the user has at different service parties separately, and the authentication center is capable of sending the setting of the user to the corresponding service party; where the specific account information of an APID which a user has at a service party includes the login rule according to which the user logs in the APID which the user has at the service party, where the login rule according to which the user logs in the APID which the user has at the service party includes one or more of the following rules, where the following rules include: whether the user is capable of logging in the APID simultaneously by using different terminals or different terminal programs, the IP range of the user in which the user is capable of logging in the APID of the user, the geographic range of the user in which the user is capable of logging in the APID of the user, the time range in which the user is capable of logging in the APID of the user, and the inactive duration after which the user's logging in the APID will be invalidated.

Optionally, when a user registers an APID through the AUID of the user, the user is capable of choosing one item of information from the multiple items of information which are stored at the authentication center by the user to set as the specific information in the specific account information of the APID which the user is registering, and/or when the user registers an APID through the AUID of the user, the user is capable of choosing one from the multiple items of specific account information which are stored at the authentication center by the user to set as the specific account information of the APID which the user is registering.

Optionally, the communication path or route of the separate connection which a user establishes to a service party by using a terminal doesn't include or doesn't pass through the authentication center, and the communication path or route of the separate connection which a user establishes to the authentication center by using a terminal doesn't include or doesn't pass through a service party; where a user is capable of using different terminals to log in a service party; where the APIDs which a user has at different service parties are separate from each other.

Optionally, a user has a user account or an APID at each of at least two different service parties separately.

DETAILED DESCRIPTION

Embodiment 1

Figure 1:
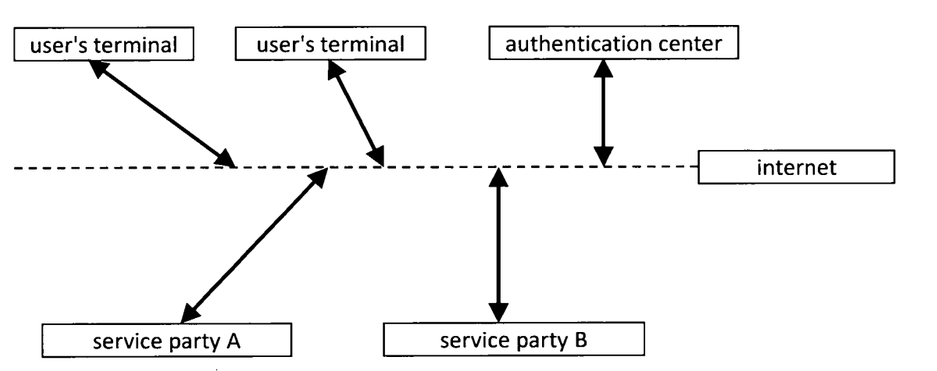
FIG. 1 is a network structure diagram of Embodiment 1.

In this embodiment the authentication center is a third-party authentication center with multiple functions on the internet. In this embodiment a service party is one of different websites and service providers which provide different services on the internet. A user is capable of using different terminals to log in the authentication center and is capable of using different terminals to log in a service party.

After a user registers at the authentication center, the user is capable of associating the APIDs which the user has at different service parties to the AUID which the user has at the authentication center. And the authentication center stores the corresponding relationships between the AUID of a user and the APIDs which the user has at different service parties. And a terminal's interface which has logged in a user's AUID at the authentication center is capable of displaying the specific account information of the APIDs which the user has at different service parties separately, and on the terminal's interface which has logged in the user's AUID at the authentication center, the user is capable of setting to change the specific information of the APIDs which the user has at different service parties separately. And the user is capable of using an authentication program on different terminals to log in the user's AUID at the authentication center. And the authentication program's interface which has logged in the authentication center is capable of displaying the service parties which have associated with the AUID of the user or is capable of displaying the APIDs which the user has at the service parties. And when the authentication program has logged in the authentication center, the user is capable of logging in the user's APIDs at different service parties with the participation of the authentication program. And when the authentication program stops working, the login by which the authentication program logs in the AUID which the user has at the authentication center is invalid or invalidated too.

A user is capable of setting at a terminal's interface which has logged in the AUID which the user has at the authentication center to permit or forbid a specific service party to get the specific account information from the authentication center. And the specific service party may be a specific service party or a specific type of service parties or all service parties.

When the authentication program stops working, the login by which the authentication program logs in the AUID which a user has at the authentication center is invalid or invalidated, and then only after the user passes the authentication again on the terminal which the authentication program is running on, the authentication program on the terminal is capable of logging in the user's AUID at the authentication center again.

A login is maintained by a session based on the session information of two parties or is maintained by a connection based on the network addresses of two parties. For example, the login by which a user's terminal logs in the AUID which the user has at the authentication center or the login by which a user's terminal logs in the APID which the user has at a service party may be based on the connectionless session of two parties (such as session secret key or Session ID), or may also be based on the connection of network addresses (TCPIP addresses) mapping of the two parties.

After a user registers an AUID at the authentication center, the user is capable of associating the APIDs which the user has at different service parties with the AUID which the user has at the authentication center, and after the association, the authentication center stores the corresponding relationships between the AUID which the user has at the authentication center and the APIDs which the user has at different service parties.

A terminal's interface which has logged in an AUID which a user has at the authentication center is capable of displaying the specific account information of the APIDs which the user has at different service parties, and on the terminal's interface which has logged in the AUID which the user has at the authentication center, the user is capable of setting to change the specific information of the APIDs which the user has at different service parties.

The specific account information includes user contact information, where the user contact information of a user includes the mobile phone number of the user and/or the email address of the user. And the contact information of a user may include the contact address of the user.

The specific account information includes user profile photo and/or user name.

The specific account information includes user real-name authentication information, where a user is capable of operating on a terminal's interface which has logged in the AUID which the user has at the authentication center to transfer and set the real-name authentication information of the user authenticated at the authentication center to a service party when the service party and the authentication center permit, and/or a user is capable of operating on a terminal's interface which has logged in the AUID which the user has at the authentication center to delete and/or to invalidate the real-name authentication information which the user sets for a service party when the service party and the authentication center permit.

After a user passes the real-name authentication of the authentication center, the authentication center maintains the real-name authentication information of the user. And the means that a user passes the real-name authentication of the authentication center may be the online authentication or the offline authentication.

The real-name authentication information includes the national identification number of a user or the passport number of a user.

The specific account information includes the permission to permit the APID which a user has at a service party to pay and/or to receive the payment, and/or includes the permission to permit the APID which a user has at a service party to pay and/or to receive the payment through the user's other fund account which is not at the service party. And the user's other fund account which is not at the service party is the user's account which is at the bank or other institution which is not the service party.

A user is capable of operating on a terminal's interface which has logged in the AUID which the user has at the authentication center to associate the APID which the user has at a service party to the user's other fund account which is not at the service party and to authorize the APID which the user has at the service party to pay with the fund of the user's other fund account and/or to receive the payment for the user's other fund account.

A user is capable of operating on a terminal's interface which has logged in the AUID which the user has at the authentication center to cancel or invalidate the association or the authorization of the user between the APID which the user has at a service party and the user's other fund account which is not at the service party.

The specific account information may include user contact address.

The specific account information may include other information of an APID which a user has at a service party When a terminal of a user stops working, the terminal's logging in the AUID which the user has at the authentication center is invalid or invalidated.

The specific account information of a user includes the historic records of the logins by which different terminals or different programs on different terminals log in the APIDs which the user has at different service parties, where the historic records include the identification information of different terminals or the identification information of different programs on different terminals.

The specific account information of a user includes the historic records of the logins by which different terminals or different programs on different terminals log in the user's APIDs at different service parties through the user's logging in the AUID which the user has at the authentication center, where the historic records include the identification information of different terminals or the identification information of different programs on different terminals.

A specific terminal which is recorded or a specific program of a specific terminal which is recorded is capable of being identified from the historic records. A historic record includes login time. A historic record includes login duration.

A service party is capable of sending the records of the logins by which different terminals or different programs on different terminals log in the APID which a user has at the service party to the authentication center, where the records include the identification information of different terminals or the identification information of different programs on different terminals.

The authentication center stores the records of the logins by which different terminals or different programs on different terminals log in the APIDs which a user has at different service parties through the user's logging in the AUID which the user has at the authentication center, where the records include the identification information of different terminals or the identification information of different programs on different terminals.

A specific terminal which is recorded or a specific program of a specific terminal which is recorded is capable of being identified from the records. The record includes login time. The record includes login duration.

The specific account information of an APID which a user has at a service party includes the login rule according to which the user logs in the APID which the user has at the service party.

The login rule according to which a user logs in the APID which the user has at a service party includes one or more rules following.

The login rule according to which a user logs in the APID which the user has at a service party includes if the user is capable of logging in the APID simultaneously by using different terminals or different terminal programs.

The login rule according to which a user logs in the APID which the user has at a service party includes the IP range of the user which is capable of logging in the APID of the user.

The login rule according to which a user logs in the APID which the user has at a service party includes the geographic range of the user in which the user is capable of logging in the APID of the user. For example: the user is capable of logging in the APID only in China.

The login rule according to which a user logs in the APID which the user has at a service party includes the time range in which the user is capable of logging in the APID of the user. For example: the user is capable of logging in the APID only when it's not night rest time.

The login rule according to which a user logs in the APID which the user has at a service party includes the inactive duration after which the user's logging in the APID will be invalidated When a user has logged in the AUID which the user has at the authentication center, the user is capable of registering APID at different service parties through the AUID which the user has at the authentication center.

The authentication center stores the corresponding relationships between the AUID of a user and the APIDs which the user has at different service parties.

When a user registers an APID through the AUID of the user, the user is capable of choosing one item of information from the multiple items of information which are stored at the authentication center by the user to set as the specific information in the specific account information of the APID which the user is registering. For example: a user may choose one from the user's mailbox, the user's mobile phone and the user's username in the related information of the user's AUID at the authentication center as the user's username when the user is registering the APID.

When a user registers an APID through the AUID of the user, the user is capable of choosing one from the multiple pieces of specific account information which are stored at the authentication center by the user to set as the specific account information of the APID which the user is registering. For example: the user stores several different profile photos, and the user may choose one from these different profile photos as the profile photo of the APID of the user.

When a user registers an APID through the AUID of the user, the user is capable of choosing on the interface which has logged in the AUID which the user has at the authentication center one item of information from the multiple items of information which are stored at the authentication center by the user to set as the specific information in the specific account information of the APID which the user is registering.

The specific account information set by a user at the authentication for a service party, may be the specific account information specifically set for the service party, or may be the universal specific account information specifically set for the specific type of the service parties, or may be the universal specific account information specifically set for all service parties, or may be the specific account information set for the AUID which the user has at the authentication center.

The specific account information of the APIDs which users have at a service party is stored locally at the service party, or when a service party needs to use the specific account information of a user, the service party is capable of getting the specific account information of the user from the authentication center and the specific account information of the user is set by the user at the authentication center for the service party.

The specific account information of the APIDs which users have at a service party is stored locally at the service party. When a user logs in the authentication center to set at the authentication center to change the specific account information of the APID which the user has at a service party, the authentication center is capable of sending the setting of the user to the service party.

When a service party needs to use the specific account information of a user, the service party is capable of getting the specific account information of the user from the authentication center and the specific account information is set by the user at the authentication center for the APID which the user has at the service party. When a user is logging in or has logged in the APID which the user has at a service party, the service party is capable of getting the specific account information of the user from the authentication center which user set at the authentication center for the service party.

That a user sets or operates at the authentication center refers to: after the user logs in the AUID which the user has at the authentication center by using a terminal, the user sets or operates on the terminal's interface which has logged in the AUID which the user has at the authentication center.

That a user sets or operates at the authentication center refers to: after the user logs in the AUID which the user has at the authentication center by using an authentication program running on a terminal, the user sets or operates on the terminal's authentication program's interface which has logged in the AUID which the user has at the authentication center.

A user uses an authentication program to log in the AUID which the user has at the authentication center. On the interface of the authentication program which has logged in the AUID which the user has at the authentication center, the user sets or operates the authentication center.

A user uses an authentication program to log in the AUID which the user has at the authentication center, where the user uses the authentication program to log in the APID which the user has at a service party. For example: the authentication program is a browser by which the user can log in the authentication center and service party.

A user uses an authentication program to log in the AUID which the user has at the authentication center, where the program which the user uses to log in the APID which the user has at a service party is not the authentication program. For example: the authentication program is a dedicated program which is released by the authentication, and the user uses a browser which is started by the authentication program to log in the service party.

A user uses an authentication program to log in the AUID which the user has at the authentication center, where the specific information of the APIDs which the user has at service parties is displayed on the interface of the authentication program which has logged in the AUID of the user.

A user is capable of logging in one same service party by using different terminals and a user is capable of logging in the authentication center by using different terminals.

A service party is capable of sending the login statuses or the session statuses of different terminals used by a user log in the APID which the user has at the service party to the authentication center, where after a user logs in the AUID which the user has at the authentication center by using a current terminal, the authentication center is capable of sending the login statuses or the session statuses of different terminals used by the user logging in the APIDs which the user has at different service parties to the current terminal used by the user, where on the current terminal's interface which has logged in the AUID which the user has at the authentication center, the user is capable of changing or stopping or disabling the login statuses or the session statuses of different terminals used by the user log in the APIDs which the user has at different service parties.

After a user logs in the AUID which the user has at the authentication center by using a current terminal, the authentication center is capable of sending the login statuses or the session statuses of different terminals used by the user log in the APIDs which the user has at different service parties to the current terminal used by the user. On the current terminal's interface which has logged in the user's AUID at the authentication center, the user is capable of changing or stopping or disabling the login statuses or the session statuses of different terminals used by the user log in the APIDs which the user has at different service parties.

A user is capable of setting at the authentication center to permit or forbid a specific terminal to log in the APID which the user has at a specific service party. And the specific terminal may be the terminal not registered at the authentication center or the terminal not associated with the user's AUID at the authentication center or the terminal of a specific type or a specific terminal or all terminals. When a user logs in the APID which the user has at a service party by using a terminal, the service party sends the "terminal identification information" to the authentication center and then the authentication center returns the confirmation which permits or forbids the login, or a user must log in the APID which the user has at a service party by logging in the authentication center first and then the authentication center decides directly if the user's terminal logging in the service party is permitted. For example: a user is capable of setting at the authentication center to permit or forbid mobile phone to log in the user's account at a payment platform.

A user is capable of setting at the authentication center to forbid the terminal which is not registered in the authentication center or not associated with the user's AUID at the authentication center to log in the user's APID at a specific service party or the user's APIDs at all service parties.

A user is capable of setting at the authentication center or the authentication center is capable of setting automatically by default, where the setting is that a specific terminal must log in the APID which the user has at a specific service party with the participation of the authentication center or a specific terminal is capable of logging in the user's APID only when the user has logged in the user's AUID by an authentication program. And the specific terminal may be the terminal not registered at the authentication center or the terminal not associated with the user's AUID at the authentication center or the terminal of a specific type or a specific terminal or all terminals. For example: when a user logs in the user's APID at a service party by using a specific terminal, the specific terminal must request and get the authentication certificate for this login from the authentication center, and then the specific terminal transfers the authentication certificate to the service party, and only after the service party verifies that the authentication certificate is correct, the service party will permit the specific terminal to log in the user's APID.

A user is capable of setting at the authentication center to permit or forbid a specific terminal to use a specific function of a specific service party. And the specific terminal may be the terminal not registered at the authentication center or the terminal not associated with the user's AUID at the authentication center or the terminal of a specific type or a specific terminal or all terminals. For example, a user is capable of setting at the authentication center to forbid mobile terminal to pay or transfer accounts through the user's account at a third-party payment platform.

When a user logs in the user's APID at a specific service party or at any service party by using a terminal which is not registered in the authentication center or not associated with the user's AUID at the authentication center, the authentication center sends the request for confirmation to the user, and only after the user confirms to the authentication center, the terminal is capable of logging in the user's APID.

After a user has logged in the user's AUID at the authentication center by using the authentication program on the terminal, one example of the interface structure of the authentication program is like the following table. The following table is just a typical example and the exact interface structure may be transformed to other forms. In the following table, the user's AUID at the authentication center is Username 1, and the APID which the user has at the service party A is Username 2, and the APID which the user has at the service party B is Username 3. There may be more service parties which are similar to the service party A and B.

| user's AUID the name of the service party | Username 1 the user's APID | the name of the specific account information | the content of the specific account information |
|---|---|---|---|
| Service party A | Username 2 | Nickname | None |
| | | Profile photo | 'displaying the head portrait here' |
| | | Authenticated mobile phone | 1234567890 |
| | | Authenticaed mail box | OK@OK.com |
| | | real-name authentication | ID number: 1234567890 |
| Service party B | Username 3 | Nickname | None |
| | | Profile photo | 'displaying the head portrait here' |
| | | Authenticated mobile phone | 1234567890 |
| | | Authenticaed mail box | OK@OK.com |
| | | real-name authentication | ID number: 1234567890 |
| Service party C ... | ... | ... | ... |
| ... | ... | ... | ... |

The embodiment 1 may include any step or characteristic applicable in the following description besides the description above, or technical personnel in the field may transform or change the embodiment 1 according to any step or characteristic applicable in the following description to realize this invention in the way different from the description above. The realizations or embodiments of this invention are impossible to be exhausted in this invention description, but the technical personnel in the field may transform or change the schemes of this invention according to the following description and these schemes transformed or changed obviously belong to the scope which this invention description has disclosed or supported.

An authentication center system or method includes an authentication center, service parties, users and terminals, where the terminals are connected with the authentication center and the service parties by a network and are capable of communicating with them; where a user has a user account AUID at the authentication center, and a user has a user account APID at a service party; where a user is capable of using a terminal to establish a separate connection with the authentication center and a separate connection with a service party separately, and the user is capable of using the terminal to log in the AUID which the user has at the authentication center through the separate connection with the authentication and to log in the APID which the user has at the service party through the separate connection with the service party; where the authentication center stores the corresponding relationships between the AUID of a user and the APIDs which the user has at different service parties; where a terminal's interface which has logged in the AUID which a user has at the authentication center is capable of displaying the specific account information of the APIDs which the user has at different service parties separately, where on the terminal's interface which has logged in the AUID which the user has at the authentication center, the user is capable of setting to change the specific information of the APIDs which the user has at different service parties separately, where the specific account information includes user contact information, where the user contact information of a user includes the mobile phone number of the user and/or the email address of the user.

An authentication center system or method includes an authentication center, service parties, users and terminals, where the terminals are connected with the authentication center and the service parties by a network and are capable of communicating with them; where a user has a user account AUID at the authentication center, and a user has a user account APID at a service party; where a user is capable of using a terminal to establish a separate connection with the authentication center and a separate connection with a service party separately, and the user is capable of using the terminal to log in the AUID which the user has at the authentication center through the separate connection with the authentication and to log in the APID which the user has at the service party through the separate connection with the service party; where the authentication center stores the corresponding relationships between the AUID of a user and the APIDs which the user has at different service parties; where a terminal's interface which has logged in the AUID which a user has at the authentication center is capable of displaying the specific account information of the APIDs which the user has at different service parties separately, where on the terminal's interface which has logged in the AUID which the user has at the authentication center, the user is capable of setting to change the specific information of the APIDs which the user has at different service parties separately; where the specific account information includes user profile photo and/or user name.

An authentication center system or method includes an authentication center, service parties, users and terminals, where the terminals are connected with the authentication center and the service parties by a network and are capable of communicating with them; where a user has a user account AUID at the authentication center, and a user has a user account APID at a service party; where a user is capable of using a terminal to establish a separate connection with the authentication center and a separate connection with a service party separately, and the user is capable of using the terminal to log in the AUID which the user has at the authentication center through the separate connection with the authentication and to log in the APID which the user has at the service party through the separate connection with the service party; where the authentication center stores the corresponding relationships between the AUID of a user and the APIDs which the user has at different service parties; where a terminal's interface which has logged in the AUID which a user has at the authentication center is capable of displaying the specific account information of the APIDs which the user has at different service parties separately, where on the terminal's interface which has logged in the AUID which the user has at the authentication center, the user is capable of setting to change the specific information of the APIDs which the user has at different service parties separately; where the specific account information includes user real-name authentication information, and a user is capable of operating on a terminal's interface which has logged in the AUID which the user has at the authentication center to transfer and set the real-name authentication information of the user authenticated at the authentication center to a service party when the service party and the authentication center permit, and/or a user is capable of operating on a terminal's interface which has logged in the AUID which the user has at the authentication center to delete and/or to invalidate the real-name authentication information of the APID which the user has at the service party when the service party and the authentication center permit.

An authentication center system or method includes an authentication center, service parties, users and terminals, where the terminals are connected with the authentication center and the service parties by a network and are capable of communicating with them; where a user has a user account AUID at the authentication center, and a user has a user account APID at a service party; where a user is capable of using a terminal to establish a separate connection with the authentication center and a separate connection with a service party separately, and the user is capable of using the terminal to log in the AUID which the user has at the authentication center through the separate connection with the authentication and to log in the APID which the user has at the service party through the separate connection with the service party; where the authentication center stores the corresponding relationships between the AUID of a user and the APIDs which the user has at different service parties; where a terminal's interface which has logged in the AUID which a user has at the authentication center is capable of displaying the specific account information of the APIDs which the user has at different service parties separately, where on the terminal's interface which has logged in the AUID which the user has at the authentication center, the user is capable of setting to change the specific information of the APIDs which the user has at different service parties separately; where the specific account information of the APID which a user has at a service party includes the permission to permit the APID which the user has at the service party to pay and/or to receive the payment, and/or includes the permission to permit the APID which the user has at the service party to pay and/or to receive the payment through the user's other fund account which is not at the service party.

An authentication center system or method includes an authentication center, service parties, users and terminals, where the terminals are connected with the authentication center and the service parties by a network and are capable of communicating with them; where a user has a user account AUID at the authentication center, and a user has a user account APID at a service party; where a user is capable of using a terminal to establish a separate connection with the authentication center and a separate connection with a service party separately, and the user is capable of using the terminal to log in the AUID which the user has at the authentication center through the separate connection with the authentication and to log in the APID which the user has at the service party through the separate connection with the service party; where the authentication center stores the corresponding relationships between the AUID of a user and the APIDs which the user has at different service parties; where a terminal's interface which has logged in the AUID which a user has at the authentication center is capable of displaying the specific account information of the APIDs which the user has at different service parties separately, where on the terminal's interface which has logged in the AUID which the user has at the authentication center, the user is capable of setting to change the specific information of the APIDs which the user has at different service parties separately; where a user is capable of using an authentication program on different terminals to log in the AUID which the user has at the authentication center, where the authentication program's interface which has logged in the AUID which the user has at the authentication center is capable of displaying the service parties or the user's APIDs which are already associated with the user's AUID, where when the authentication program has already logged in the AUID which the user has at the authentication center, the user is capable of logging in the APIDs which the user has at different service parties with the participation of the authentication program, where when the authentication program or the terminal stops working, the authentication program's logging in the user's AUID at the authentication center is invalid or invalidated too.

An authentication center system or method includes an authentication center, service parties, users and terminals, where the terminals are connected with the authentication center and the service parties by a network and are capable of communicating with them; where a user has a user account AUID at the authentication center, and a user has a user account APID at a service party; where a user is capable of using a terminal to establish a separate connection with the authentication center and a separate connection with a service party separately, and the user is capable of using the terminal to log in the AUID which the user has at the authentication center through the separate connection with the authentication and to log in the APID which the user has at the service party through the separate connection with the service party; where the authentication center stores the corresponding relationships between the AUID of a user and the APIDs which the user has at different service parties; where a terminal's interface which has logged in the AUID which a user has at the authentication center is capable of displaying the specific account information of the APIDs which the user has at different service parties separately; where the specific account information of a user includes the historic records of the logins by which different terminals or different programs on different terminals log in the APIDs which the user has at different service parties, where the historic records include the identification information of different terminals or the identification information of different programs on different terminals.

An authentication center system or method includes an authentication center, service parties, users and terminals, where the terminals are connected with the authentication center and the service parties by a network and are capable of communicating with them; where a user has a user account AUID at the authentication center, and a user has a user account APID at a service party; where a user is capable of using a terminal to establish a separate connection with the authentication center and a separate connection with a service party separately, and the user is capable of using the terminal to log in the AUID which the user has at the authentication center through the separate connection with the authentication and to log in the APID which the user has at the service party through the separate connection with the service party; where the authentication center stores the corresponding relationships between the AUID of a user and the APIDs which the user has at different service parties; where a terminal's interface which has logged in the AUID which a user has at the authentication center is capable of displaying the specific account information of the APIDs which the user has at different service parties separately; where the specific account information of a user includes the historic records of the logins by which different terminals or different programs on different terminals log in the APIDs which the user has at different service parties and the user logs in the APIDs through the logging in the AUID which the user has at the authentication center, where the historic records include the identification information of different terminals or the identification information of different programs on different terminals.

An authentication center system or method includes an authentication center, service parties, users and terminals, where the terminals are connected with the authentication center and the service parties by a network and are capable of communicating with them; where a user has a user account AUID at the authentication center, and a user has a user account APID at a service party; where a user is capable of using a terminal to establish a separate connection with the authentication center and a separate connection with a service party separately, and the user is capable of using the terminal to log in the AUID which the user has at the authentication center through the separate connection with the authentication and to log in the APID which the user has at the service party through the separate connection with the service party; where the authentication center stores the corresponding relationships between the AUID of a user and the APIDs which the user has at different service parties; where a terminal's interface which has logged in the AUID which a user has at the authentication center is capable of displaying the specific account information of the APIDs which the user has at different service parties separately, where on the terminal's interface which has logged in the AUID which the user has at the authentication center, the user is capable of setting to change the specific information of the APIDs which the user has at different service parties separately; where the specific account information of an APID which a user has at s service party includes the login rule according to which the user logs in the APID which the user has at the service party.

An authentication center system or method includes an authentication center, service parties, users and terminals, where the terminals are connected with the authentication center and the service parties by a network and are capable of communicating with them; where a user has a user account AUID at the authentication center, and a user has a user account APID at a service party; where a user is capable of using a terminal to establish a separate connection with the authentication center and a separate connection with a service party separately, and the user is capable of using the terminal to log in the AUID which the user has at the authentication center through the separate connection with the authentication and to log in the APID which the user has at the service party through the separate connection with the service party; where the authentication center stores the corresponding relationships between the AUID of a user and the APIDs which the user has at different service parties; where when a user registers an APID through the AUID which the user has at the authentication center, the user is capable of choosing one item of information from the multiple items of information which are stored at the authentication center by the user to set as the specific information in the specific account information of the APID which the user is registering, and/or when a user registers the APID through the AUID which the user has at the authentication center, the user is capable of choosing one from the multiple pieces of specific account information which are stored at the authentication center by the user to set as the specific account information of the APID which the user is registering.

The login rule according to which a user logs in the APID which the user has at a service party includes the IP range which is capable of logging in the APID of the user.

When a user registers an APID through the AUID of the user, the user is capable of choosing on an interface which has logged in the AUID which the user has at the authentication center one from the multiple pieces of specific account information which are stored at the authentication center by the user to set as the specific account information of the APID which the user is registering.

A user uses the authentication program on a terminal to log in the authentication center. A user sets or operates the authentication center on a terminal's authentication program's interface which has logged the AUID which the user has at the authentication center.

A user is capable of operating to choose to log in different service parties on a terminal's authentication program's interface which has logged in the AUID which the user has at the authentication center.

The program which a user uses to log in a service party is the authentication program, or the program which a user uses to log in a service party is not the authentication program. For example: when the authentication program is a browser, the user is capable of logging in the service party by the same browser. For example: when the authentication program is a special program issued by the authentication center, the user is capable of logging in the service party by a new browser started by the authentication program.

A user is capable of logging in a service party by one click on a terminal's authentication program's interface which has logged in the AUID which the user has at the authentication center. For example, the user clicks on a link to the service party on the authentication program's interface, and then the terminal of the user logs in the service party directly.

The specific account information of the APID which a user has at a service party is displayed on an authentication program's interface which has logged in the AUID which the user has at the authentication center, and the user sets at the authentication program's interface which has logged in the AUID which the user has at the authentication center to change the specific account information of the APIDs which the user has at different service parties.

When a user's terminal or the authentication program on a user's terminal stops running, the terminal's or the authentication program's logging in the user's AUID at the authentication center is invalid or invalidated too.

When the login by which a user's terminal or the authentication program on a user's terminal logging in the user's AUID at the authentication center is invalid, the user must input again the user verification information into the terminal or use the verification device on the terminal to pass the identity authentication, and then the terminal or the authentication program is capable of logging in again the user's AUID at the authentication center. For example: the user's terminal is a mobile phone in which the operating system's interface is opened by fingerprint identification, and the user must use the fingerprint to reopen the mobile phone's operating system's interface after the mobile phone is shut down, and the mobile phone is capable of logging in again the user's AUID at the authentication center only after the interface of the mobile phone is open, and of course, the mobile phone may need pass other authentication or the authentication of the authentication center to log in the user's AUID at the authentication center after the user opens the interface of the operating system of the mobile phone.

A user is capable of logging in a service party without using the authentication center, or a user is capable of logging in a service party with the participation of the authentication center and a terminal when the terminal has logged in the authentication center. For example, the user clicks the link to the service party on the terminal's interface which has logged in the authentication center, and the authentication transfers the verification credential to the service party through the user's terminal, and the credential may be retransmitted by the authentication program or by other programs on the terminal, and at last if the service party confirms that the credential is correct, the user's terminal logs in the user's APID at the service party by the program which retransmits the verification credential Each time a user logs in a service party with the participation of the authentication center and by using a terminal, the authentication center sends the verification credential to the service party directly or through the terminal.

A verification credential is specifically used for a service party by the authentication center, and the verification credential is not capable of being used to log in other service parties.

A verification credential is specifically used for a user or a user's terminal by the authentication center, and other users or other user's terminals are not capable of using the verification credential to log in a service party.

A verification credential has the period of validity and an expired verification credential is invalid.

When a user log in a service party with the participation of the authentication center, the service party is not capable of logging in other service parties as the identity of the user through the login by which the user logs in the service party. For example, the verification credential is used specifically for the service party by the authentication center, and the service party is not capable of pretending to be the user to log in other service parties by using the verification credential received by the service party.

When the login status or the session status of a terminal logging in a APID which a user has at a service party is invalid, only after the user inputs a user verification information into the terminal or after the user passes the identity authentication by using a verification device or after the user passes the indirect authentication of a third party on the terminal, the terminal is capable of logging in the user's APID at the service party, and then the login status or the session status of the terminal logging in the user's APID at the service party is capable of changing to be valid.

When the login status or the session status of a terminal logging in a user's AUID at the authentication center is invalid, only after the user inputs a user verification information into the terminal or after the user passes the identity authentication by using a verification device or after the user passes the indirect authentication of a third party on the terminal, the terminal is capable of logging in the user's AUID at the authentication center, and then the login status or the session status of the terminal logging in the user's AUID at the authentication center is capable of changing to be valid.

A user verification information or a user verification device is the information or the device uniquely owned by a user and is what the user is capable of using to pass the identity authentication on different terminals. The "inputting a user verification information into a terminal" refers to inputting into the terminal by the input device of the terminal or by other device.

A user verification device is a portable external device.

That a user inputs a user verification information into a terminal or that a user uses a user verification device refers to that the user inputs the user verification information manually or that the user uses the user verification device manually.

The means of inputting a user verification information or the means of using a user verification device include username/password, returning code or agreed code, user biological characteristics, portable external IC card, and scanning two-dimensional code by mobile phone. And username/password, returning code, agreed code, and user biological characteristics are the user verification information. And mobile phone and portable external IC card are the user verification devices. The returning code is the means that the authentication center or a service party returns a confirmation code to a specific terminal of a user and the user inputs it into a current terminal to pass the identity authentication of the authentication center or the service party. The agreed code may be paper-based or electronic dynamic password, and a user must input the agreed code of designated sequence number or input the dynamic password displayed currently to pass the authentication. The user biological characteristics is the means that a user uses his own biological characteristics to pass the identity authentication, for example: the fingerprint of the user. The portable external IC card is the means of USB key and a user must connect the IC (USB key) to the peripheral interface (USB interface) of a terminal to pass the authentication. The scanning two-dimensional code by mobile phone refers to the means that a user uses the camera of a mobile phone to scan the two-dimensional code displayed by a displayer and then the mobile phone sends the information of the two-dimensional code to the party which is logged in or to the third party assisting the login, in which the party which is logged in permits the terminal of the user to log in the corresponding user account of the party which is logged in if the party which is logged in or the third party confirms that the information of the two-dimensional code is correct, in which the third party will notify the party which is logged in after the third party confirms that the information of the two-dimensional code is correct.

When a user uses a terminal to log in a service party, a third party refers to another party different from the terminal and the service party on the network. When the terminal logs in the service party through the indirect authentication of the third party, the authentication center may be the third party which provides the indirect authentication of the third party.

When a user logs in the authentication center by using a terminal, a third party refers to another party different from the terminal and the authentication center on the network.

After a user logs in the authentication center by using a current terminal, the list of the user's APIDs at different service parties associated with the authentication center will be displayed on the interface of the current terminal which the user is using when the interface has logged in the authentication center.

A user logs in the authentication center by using an authentication program on a terminal. And the user is capable of setting the login statuses or the session statuses on the interface of the authentication program.

A user logs in the user's APIDs at different service parties with the participation of the authentication program and the authentication center. The user may log in the user's APIDs at different service parties by one click on the interface of the authentication program.

A user is not capable of logging in a service party with the participation of the authentication program when the authentication program stops running, and only when the user logs in the authentication center by using the authentication program, the user is capable of logging in the user's APID at the service party with the participation of the authentication program.

A user is capable of using other program which is not the authentication program to log in the user's APID at a service party with the participation of the authentication program.

If an authentication program on a terminal is running and the login status of the authentication program logging in the user's AUID at the authentication center maintains valid, the authentication program will participate in the steps of transferring the "terminal identification information" of the terminal or the "terminal service party identification information" to a service party when a user logs in the service party.

If an authentication program on a terminal maintains running and the login status of the terminal logs in the user's AUID at the authentication center maintains valid, the authentication program will participate in the procedure that the user logs in the user's APID at a service party by using the terminal. When the authentication program participate in the procedure that the user logins the user's APID at the service party by using the terminal, the user's terminal log in the service party by the authentication program or by other program which is not the authentication program. The authentication program may be a web browser or a specific program which is not the web browser.

A service party is not capable of logging in other service parties as the identity of a user through the login by which the user logs in the service party.

The different service parties are separate from each other. The different service parties are separate from each other and don't need to trust each other and have no trust relationship to each other. The different service parties don's share the account security with each other.

The APIDs which a same user has at different service parties are separate from each other. The APIDs which a same user has at different service parties don't need to trust each other or to be associate with each other.

There is no mutual membership relation to each other between a service party and the authentication center. And a service party and the authentication center are the entities operating separately.

The terminals, the service parties and the authentication center are connected through internet. The information transmission between the terminals, the service parties and the authentication center is transferred through internet.

The authentication center or a service party may be server or server group. And a service party may be a provider of service on internet which provides the resources and services to the user through internet, such as website. And the authentication center is an operator on internet which is specialized in providing the authentication login service through internet.

A terminal used by a user may be PC, desktop computer, notebook computer, tablet computer or smart mobile phone.

The communication path or route of the separate connection which a user establishes to a service party by using a terminal doesn't include or doesn't pass through the authentication center. The communication path or route of the separate connection which a user establishes to the authentication center by using a terminal doesn't include or doesn't pass through a service party.

The authentication center stores the corresponding relationships between a user's AUID at the authentication center and the APIDs which the user has at different service parties, and specially it may be: the authentication center stores correspondingly the user's AUID at the authentication center and the APIDs which the user has at different service parties. The corresponding relationship between the AUID of a user and the APID which the user has at a service party is associated by the user at the authentication center or at the service party, and after the user associates at the service party, the service party sends the notification of the association or the confirmation of the association to the authentication center.

A service party stores the corresponding relationship between the AUID which a user has at the authentication center and the APID which the user has at the service party too. And after the user associates the AUID and the APID at the authentication center or at the service party, the service party stores the APID and the AUID correspondingly too.

Different terminals of a same user connect to the network or internet separately from each other.

The following scheme is a typical scheme for this embodiment 1, in which a user can check and set the login statuses of different terminals in the authentication center.

In this scheme, the authentication center is the server (server group) of a service provider which provides login information service through internet. This scheme includes different service parties and these service parties are different and separate providers which provide service through internet and which trust the authentication center (for example: two separate websites-service party A and service party B). A user uses different terminals to log in the service parties and the different terminals include multiple terminals of different types which include mobile phone, PC, tablet computers, etc (for example: a user may have 2 PCs, 1 mobile phone, 1 tablet computer, which are 4 different terminals of 3 types totally).

Firstly, the following Preposed-step is required to be carried out and needs to be carried out only once.

Preposed-step: a user registers APID-A at the service party A and registers APID-B at the service party B and registers AUID at the authentication center, and then at the different service parties (A and B) or at the authentication center, the user associates APID-A and APID-B to AUID, and the different service parties (A and B) send the association notifications to the authentication center to confirm or the authentication center sends the association notifications to the different service parties to confirm.

For example: after the user logs in the service party A, the user sends the AUID which the user has at the authentication center to the service party A; and the service party A sends the user's APID-A and AUID together as the association notification to the authentication center; and if the authentication center confirms that the AUID exists, the authentication center stores the APID-A and the AUID correspondingly and returns association confirmation to the service party A; and after the service party A receives the association confirmation, the service party A stores the AUID and the user's APID-A correspondingly; and the service party A returns the message of association success to the authentication center. For another example: after the user logs in the authentication center by using a terminal, the user inputs the user's APID-B at the service party B, the name of the service party B, and the user's identification password at the service party B into the terminal's interface which has logged in the authentication center to associate; and the authentication center sends the association notification which includes the user's APID-B at the service party B, the user's identification password at the service party B and the AUID which the user has at the authentication center to the service party B; and if the service party B confirms that the identification password is correct, the service party B stores the user's APID-B and AUID correspondingly and returns the association confirmation to the authentication center; after the authentication center receives the association confirmation, the authentication center stores the user's APID-B and AUID correspondingly too; and at last the authentication center sends the message of association success to the service party.

Then the following steps are capable of being carried out.

The first step: the user logs in the APIDs which the user has at different parties separately by using different terminals (for example, a PC and a mobile phone separately log in both the service party A and B and maintain the valid login status). And if the user has not made a terminal exit from the login logging in a service party, the user is capable of logging in the APID at the service party directly with no need for that the user passes the identity authentication on the terminal by inputting a user verification information or by using a user verification device or that the user passes the indirect authentication of a third party. And a valid status of a login is maintained by a valid session between a terminal (the PC, the mobile phone) and a service party (A, B), for example: after the user logs in the service party A by using a PC, the service party A generates a session secret key (such as Cookie) to send to the PC; and the PC may store the session secret key in hard disk or other nonvolatile storage medium; if the session secret key is valid, the PC is capable of logging in the APID-A at the service party A directly by means of the session secret key (such as using the browser supporting Cookie) with no need for that the user passes the identity authentication on the terminal by inputting a user verification information or by using a user verification device or that the user passes the indirect authentication of a third party.

The second step: when the user is logging in the AUID at the authentication center by using a terminal or by a terminal's authentication program issued by the authentication center, the authentication center sends the requests for refreshing the login status to the corresponding service parties associated with the AUID (such as service party A and service party B), and then after different service parties (such as A and B) receives the requests for refreshing the login status, each of the different service parties returns the login status of different terminals which the user used or is using logging in the service party to the authentication center (for example: the login status of the PC and the mobile phone logging in the APID-A at the service party A and the APID-B at the service party B are all valid currently).

After the user logs in the authentication center by using a terminal, the service parties send the login status or the session status to the authentication center. When the user logs in the AUID which the user has at the authentication center by using a terminal and requests for refreshing the information of the status, the service parties send the login status or the session status to the authentication center. When the login status or the session status of the terminal used by the user logging in the APID which the user has at a service party changes, the service party sends the refreshed login status or the session status to the authentication center.

After the user logs in the authentication center by using a current terminal, the authentication center sends the login status of different terminals used by the user logging in the authentication center to the current terminal used by the user.

The third step, authentication center sends the login status received to the terminal which the user is using and which has logged in the AUID. On the terminal's interface which has logged in the authentication center, the user is capable of seeing the list of the login status or the session status of different terminals which the user used or is using logging in the APIDs which the user has at different service parties.

When the login status of different terminals used by the user logging in different service parties changes, the corresponding service party sends the changed login status to the authentication center and then the authentication center sends the status to the user's terminal, for example: the user may choose to exit the login on the mobile phone's interface which has logged in the service party A, and the service party A sends the information of the invalid login status of the user's mobile phone to the authentication center, and then the authentication center sends the invalid login status to the user's current terminal which has logged in the authentication center, and then the user is capable of seeing the update of the login status of the terminals used by the user in real time. The user may choose on the terminal's interface which has logged in the authentication center to update the login status of a specific service party or of a specific terminal.

The forth step, on the interface which has logged in the authentication center, the user is capable of setting to change or stop or invalidate the login status or the session status of different terminals used by the user logging in the APIDs which the user has at different service parties. And the setting to change includes setting to make the login status or session valid or invalid or pause. For example: the interface of the PC or tablet computer used by the user has currently logged in the AUID of the authentication center, and the user sets on the interface to invalidate the login status of the mobile phone logging in the APID-A at the service party A, and then the authentication center sends the invalidation instruction to the service party A, and after the service party A receives the invalidation instruction, the service party A deletes or invalidates the session secret key which is generated by the service party A for the user's mobile phone or for the program on the mobile phone, and then the mobile phone of the user is not capable of logging in the user's APID-A directly (the login status is invalid) when reconnecting to the address of the service party A, and then before the user's mobile phone is capable of logging in the APID-A again (the login status is capable of becoming valid again), the user must pass the identity authentication of the service party A on the mobile phone by inputting a user verification information or by using a user verification device. In the same way, on the interface which has logged in the authentication center, the user is capable of setting the login status or the session status of the PC logging in the service party A and the service party B.

A user is capable of setting at the authentication center to permit or forbid a specific terminal to log in the APID which the user has at a specific service party. And the specific terminal may be the terminal not registered on the authentication center or the terminal not associated with the AUID which the user has at the authentication center or the terminal of a specific type or a specific terminal or all terminals. When a user logs in the APID which the user has at a service party by using a terminal, the service party sends the "terminal identification information" of the terminal to the authentication center, and then the authentication center returns a confirmation to the service party and the confirmation permits or forbids the login, or when a terminal of a user has logged in the authentication center first and then is logging in the APID which the user has at a service party by using the authentication center, the authentication center decides directly if the login is permitted. For example: a user is capable of setting at the authentication center to permit or forbid the mobile terminal to log in the user's account at a payment platform.

A user is capable of setting at the authentication center to forbid a terminal which is not registered on the authentication center or not associated with the AUID which the user has at the authentication center to log in the APID which the user has at a specific service party or the APIDs which the user has at all service parties.

A user is capable of setting at the authentication center or the authentication center is capable of setting automatically by default, and the setting is that a specific terminal must log in the APID which the user has at a specific service party by using the authentication center or a specific terminal is capable of logging in the APID which the user has only when the user has logged in the AUID which the user has by the authentication program. And the specific terminal may be the terminal not registered on the authentication center or the terminal not associated with the AUID which the user has at the authentication center or the terminal of a specific type or a specific terminal or all terminals. For example: when a user logs in the APID which the user has at a service party by using a specific terminal, the specific terminal must request and get the authentication credential for this login from the authentication center, and then the specific terminal transfers the authentication credential to the service party, and only after the service party verifies that the authentication credential is correct, the service party will permit the specific terminal to log in the user's APID.

A user is capable of setting at the authentication center to permit or forbid a specific terminal to use a specific function of a specific service party. And the specific terminal may be the terminal not registered on the authentication center or the terminal not associated with the AUID which the user has at the authentication center or the terminal of a specific type or a specific terminal or all terminals. For example, a user is capable of setting at the authentication center to forbid the mobile terminal to pay or transfer accounts through the user's account at a third-party payment platform.

This invention may form to be a standardized protocol, and the authentication center, the service party, the user and the terminals may realize this invention based on this protocol. And the authentication center may develop the programs or software modules based on this protocol to provide to the service party and the user to cooperate to realize this invention.

The invention claimed is:

1. An authentication center system, comprising an authentication center, service parties, users and terminals; wherein a service party is a provider of service on internet which provides service through internet, and the service parties are different and separate providers of service on internet; wherein the authentication center is a service provider which provides service through internet, and the authentication center is not one of the service parties; wherein the terminals are connected with the authentication center and the service parties by a network and are capable of communicating with them; wherein the terminals, the service parties and the authentication center are connected through internet; wherein a user has a user account at the authentication center, and the AUID of a user is a user account which the user has at the authentication center; wherein a user has a user account at one service party or at each of more than one service party separately, and an APID of a user is a user account which the user has at a service party; wherein a user is capable of using a terminal to establish a separate connection with the authentication center and a separate connection with a service party separately, and the user is capable of using the terminal to log in the AUID which the user has at the authentication center through the separate connection with the authentication center and to log in the APID which the user has at the service party through the separate connection with the service party separately; wherein the authentication center stores the corresponding relationships between the AUID of a user and the APIDs which the user has at different service parties; wherein an APID which a user has at a service party is capable of having the specific account information of the APID which the user has at the service party; wherein a terminal's interface which has logged in the AUID which a user has at the authentication center is capable of displaying the specific account information of the APIDs which the user has at different service parties separately, and on the terminal's interface which has logged in the AUID which the user has at the authentication center, the user is capable of setting to change the specific information of the APIDs which the user has at different service parties separately, and the authentication center is capable of sending the setting of the user to the corresponding service party; wherein the specific account information of an APID which a user has at a service party includes one or more of the following types of information, wherein the following types of information include user profile photo and user name and user contact information and user real-name authentication information; wherein if the specific account information includes user contact information, the user contact information of a user includes the mobile phone number of the user and/or the email address of the user; wherein if the specific account information includes user real-name authentication information, a user is capable of operating on a terminal's interface which has logged in the AUID which the user has at the authentication center to transfer and set the real-name authentication information of the user authenticated at the authentication center to a service party when the service party and the authentication center permit, and/or a user is capable of operating on a terminal's interface which has logged in the AUID which the user has at the authentication center to delete and/or to invalidate the real-name authentication information which the user sets for a service party when the service party and the authentication center permit.

2. The authentication center system according to claim 1, wherein the communication path or route of the separate connection which a user establishes to a service party by using a terminal doesn't include or doesn't pass through the authentication center, and the communication path or route of the separate connection which a user establishes to the authentication center by using a terminal doesn't include or doesn't pass through a service party.

3. The authentication center system according to claim 1, wherein a user has a user account or an APID at each of at least two different service parties separately.

4. The authentication center system according to claim 1, wherein a user is capable of using different terminals to log in a service party; wherein the APIDs which a user has at different service parties are separate from each other.

5. The authentication center system according to claim 1, wherein a service party stores the specific account information of the APIDs which users have at the service party locally at the service party and the authentication center is capable of sending a user's setting of the specific account information of an APID which the user has at the service party to the service party, or when a service party needs to use the specific account information of a user, the service party is capable of getting the specific account information of the user from the authentication center and the specific account information of the user is set by the user at the authentication center for the service party.

6. The authentication center system according to claim 1, wherein a terminal's interface which has logged in the AUID which a user has at the authentication center is capable of displaying separately the APIDs which the user has at different service parties, and/or a terminal's interface which has logged in the AUID which a user has at the authentication center is capable of displaying separately the service parties which have associated with the user's AUID.

7. The authentication center system according to claim 1, wherein on a terminal's interface which has logged in the AUID which a user has at the authentication center, the user is capable of setting to change the specific information of the APID which the user has at a service party, and the authentication center is capable of sending the setting of the user to the service party.

8. The authentication center system according to claim 1, wherein a user uses an authentication program to log in the AUID which the user has at the authentication center, wherein the program which the user uses to log in the APID which the user has at a service party is not the authentication program.

9. The authentication center system according to claim 1, wherein the specific account information of an APID which a user has at a service party includes the permission to permit the APID which the user has at the service party to pay and/or to receive the payment, and/or includes the permission to permit the APID which the user has at the service party to pay and/or to receive the payment through the user's other fund account which is not at the service party.

10. The authentication center system according to claim 1, wherein the APIDs of a user are capable of having the historic records of the logins by which different terminals or different programs on different terminals log in the APIDs which the user has at different service parties, wherein a terminal's interface which has logged in the AUID which a user has at the authentication center is capable of displaying the historic records of the logins by which different terminals or different programs on different terminals log in the APIDs which the user has at different service parties separately, and the historic records include the identification information of different terminals or the identification information of different programs on different terminals, wherein the historic records include login time and/or login duration, wherein a service party is capable of sending the records of the logins by which different terminals or different programs on different terminals log in the APID which a user has at the service party to the authentication center.

11. The authentication center system according to claim 1, wherein the specific account information of an APID which a user has at a service party includes the login rule according to which the user logs in the APID which the user has at the service party, wherein the login rule according to which the user logs in the APID which the user has at the service party includes one or more of the following rules, wherein the following rules include: whether the user is capable of logging in the APID simultaneously by using different terminals or different terminal programs, the IP range of the user in which the user is capable of logging in the APID of the user, the geographic range of the user in which the user is capable of logging in the APID of the user, the time range in which the user is capable of logging in the APID of the user, and the inactive duration after which the user's logging in the APID will be invalidated.

12. The authentication center system according to claim 1, wherein the terminals, the service parties and the authentication center are connected through internet, wherein the information transmission between the terminals, the service parties and the authentication center is transferred through internet.

13. The authentication center system according to claim 1, wherein a user is capable of setting at a terminal's interface which has logged in the user's AUID at the authentication center to permit or forbid a specific service party to get the specific account information from the authentication center.

14. An authentication center system, comprising an authentication center, service parties, users and terminals; wherein a service party is a provider of service on internet which provides service through internet, and the service parties are different and separate providers of service on internet; wherein the authentication center is a service provider which provides service through internet, and the authentication center is not one of the service parties; wherein the terminals are connected with the authentication center and the service parties by a network and are capable of communicating with them; wherein the terminals, the service parties and the authentication center are connected through internet; wherein a user has a user account at the authentication center, and the AUID of a user is a user account which the user has at the authentication center; wherein a user has a user account at one service party or at each of more than one service party separately, and an APID of a user is a user account which the user has at a service party; wherein a user is capable of using a terminal to establish a separate connection with the authentication center and a separate connection with a service party separately, and the user is capable of using the terminal to log in the AUID which the user has at the authentication center through the separate connection with the authentication center and to log in the APID which the user has at the service party through the separate connection with the service party separately; wherein the authentication center stores the corresponding relationships between the AUID of a user and the APIDs which the user has at different service parties; wherein an APID which a user has at a service party is capable of having the specific account information of the APID which the user has at the service party; wherein a terminal's interface which has logged in the AUID which a user has at the authentication center is capable of displaying the specific account information of the APIDs which the user has at different service parties separately, and on the terminal's interface which has logged in the AUID which the user has at the authentication center, the user is capable of setting to change the specific information of the APIDs which the user has at different service parties separately, and the authentication center is capable of sending the setting of the user to the corresponding service party; wherein the specific account information of an APID which a user has at a service party includes the permission to permit the APID which the user has at the service party to pay and/or to receive the payment, and/or includes the permission to permit the APID which the user has at the service party to pay and/or to receive the payment through the user's other fund account which is not at the service party.

15. The authentication center system according to claim 14, wherein the communication path or route of the separate connection which a user establishes to a service party by using a terminal doesn't include or doesn't pass through the authentication center, and the communication path or route of the separate connection which a user establishes to the authentication center by using a terminal doesn't include or doesn't pass through a service party; wherein a user is capable of using different terminals to log in a service party; wherein the APIDs which a user has at different service parties are separate from each other.

16. The authentication center system according to claim 14, wherein a user has a user account or an APID at each of at least two different service parties separately.

17. An authentication center system, comprising an authentication center, service parties, users and terminals; wherein a service party is a provider of service on internet which provides service through internet, and the service parties are different and separate providers of service on internet; wherein the authentication center is a service provider which provides service through internet, and the authentication center is not one of the service parties; wherein the terminals are connected with the authentication center and the service parties by a network and are capable of communicating with them; wherein the terminals, the service parties and the authentication center are connected through internet; wherein a user has a user account at the authentication center, and the AUID of a user is a user account which the user has at the authentication center; wherein a user has a user account at one service party or at each of more than one service party separately, and an APID of a user is a user account which the user has at a service party; wherein a user is capable of using a terminal to establish a separate connection with the authentication center and a separate connection with a service party separately, and the user is capable of using the terminal to log in the AUID which the user has at the authentication center through the separate connection with the authentication center and to log in the APID which the user has at the service party through the separate connection with the service party separately; wherein the authentication center stores the corresponding relationships between the AUID of a user and the APIDs which the user has at different service parties; wherein an APID which a user has at a service party is capable of having the specific account information of the APID which the user has at the service party; wherein a terminal's interface which has logged in the AUID which a user has at the authentication center is capable of displaying the specific account information of the APIDs which the user has at different service parties separately, and on the terminal's interface which has logged in the AUID which the user has at the authentication center, the user is capable of setting to change the specific information of the APIDs which the user has at different service parties separately, and the authentication center is capable of sending the setting of the user to the corresponding service party; wherein the specific account information of an APID which a user has at a service party includes the login rule according to which the user logs in the APID which the user has at the service party, wherein the login rule according to which the user logs in the APID which the user has at the service party includes one or more of the following rules, wherein the following rules include: whether the user is capable of logging in the APID simultaneously by using different terminals or different terminal programs, the IP range of the user in which the user is capable of logging in the APID of the user, the geographic range of the user in which the user is capable of logging in the APID of the user, the time range in which the user is capable of logging in the APID of the user, and the inactive duration after which the user's logging in the APID will be invalidated.

18. The authentication center system according to claim 17, wherein when a user registers an APID through the AUID of the user, the user is capable of choosing one item of information from the multiple items of information which are stored at the authentication center by the user to set as the specific information in the specific account information of the APID which the user is registering, and/or when the user registers an APID through the AUID of the user, the user is capable of choosing one from the multiple items of specific account information which are stored at the authentication center by the user to set as the specific account information of the APID which the user is registering.

19. The authentication center system according to claim 17, wherein the communication path or route of the separate connection which a user establishes to a service party by using a terminal doesn't include or doesn't pass through the authentication center, and the communication path or route of the separate connection which a user establishes to the authentication center by using a terminal doesn't include or doesn't pass through a service party; wherein a user is capable of using different terminals to log in a service party; wherein the APIDs which a user has at different service parties are separate from each other.

20. The authentication center system according to claim 17, wherein a user has a user account or an APID at each of at least two different service parties separately.

* * * * *